United States Patent
Lim et al.

(10) Patent No.: US 10,254,931 B2
(45) Date of Patent: Apr. 9, 2019

(54) METADATA-DRIVEN LIST USER INTERFACE COMPONENT BUILDER

(71) Applicant: SAP SE, Walldorf (DE)

(72) Inventors: Chee Hong Lim, Singapore (SG); Zhigao Chen, Singapore (SG); Biao Hua, Singapore (SG); Suyono Zhe Ming Kho, Singapore (SG)

(73) Assignee: SAP SE, Walldorf (DE)

( * ) Notice: Subject to any disclaimer, the term of this patent is extended or adjusted under 35 U.S.C. 154(b) by 475 days.

(21) Appl. No.: 14/032,202

(22) Filed: Sep. 20, 2013

(65) Prior Publication Data

US 2015/0089404 A1 Mar. 26, 2015

(51) Int. Cl.
*G06F 3/0484* (2013.01)
*G06F 8/38* (2018.01)

(52) U.S. Cl.
CPC ............ *G06F 3/04842* (2013.01); *G06F 8/38* (2013.01)

(58) Field of Classification Search
CPC . G06F 8/38; G06F 3/0482; G06F 8/34; G06F 17/3089
USPC ........................................ 715/841, 762, 783
See application file for complete search history.

(56) References Cited

U.S. PATENT DOCUMENTS

| | | | |
|---|---|---|---|
| 7,434,200 B2 | 10/2008 | Bender | |
| 7,543,268 B2 | 6/2009 | Cherdron et al. | |
| 7,577,937 B2 | 8/2009 | Henke et al. | |
| 7,693,860 B2 * | 4/2010 | Babanov | 707/102 |
| 8,095,565 B2 | 1/2012 | Dengler et al. | |
| 8,281,283 B2 | 10/2012 | Speth et al. | |
| 8,381,113 B2 | 2/2013 | Kamdar et al. | |
| 8,434,097 B2 | 4/2013 | Brandow et al. | |
| 8,595,236 B2 | 11/2013 | Jain et al. | |
| 9,063,645 B1 * | 6/2015 | Jitkoff | G06F 9/4443 |
| 2003/0221165 A1 | 11/2003 | Young et al. | |
| 2006/0230379 A1 * | 10/2006 | Pintos | G06F 8/38 717/109 |
| 2006/0253830 A1 | 11/2006 | Rajanala et al. | |
| 2007/0130205 A1 * | 6/2007 | Dengler | G06F 9/4443 |
| 2008/0263142 A1 | 10/2008 | Glass et al. | |
| 2008/0276218 A1 | 11/2008 | Taylor et al. | |
| 2011/0282861 A1 * | 11/2011 | Bergstraesser | G06F 17/30507 707/710 |
| 2012/0079451 A1 | 3/2012 | Halbedel et al. | |
| 2012/0166928 A1 | 6/2012 | Stern et al. | |
| 2012/0210296 A1 | 8/2012 | Boulter et al. | |
| 2013/0013649 A1 | 1/2013 | Husseini et al. | |
| 2013/0198156 A1 * | 8/2013 | Penikis | G06F 3/0482 707/705 |
| 2014/0013234 A1 * | 1/2014 | Beveridge | G06F 3/0484 715/740 |

* cited by examiner

*Primary Examiner* — Christopher J Fibbi

(74) *Attorney, Agent, or Firm* — Jones Day

(57) ABSTRACT

Disclosed herein are technologies for a metadata-driven building of list user interface (UI) components of a UI of an application. This Abstract is submitted with the understanding that it will not be used to interpret or limit the scope or meaning of the claims.

22 Claims, 7 Drawing Sheets

METADATA-DRIVEN LIST USER INTERFACE COMPONENT BUILDER

TECHNICAL FIELD

The present disclosure relates generally to a user interface technology.

BACKGROUND

Application software is a computer-executable program that directs a computer (e.g., personal computer, tablet computer, smartphone, etc.) to perform useful tasks for the benefit of the end user of the computer. Typically, application software is not involved in merely operating the computer itself. Individual application software packages are often called simply an application or an app.

Typically, an app has a user interface (UI) that allows a user (i.e., human) to interact with an application and the computer/network associated with that application. Many apps have a graphical user interface (i.e., graphical UI or GUI), which is a type of user interface that allows users to interact with electronic devices through graphical icons and visual indicators.

A GUI includes UI control objects, which may be called UI controls or UI elements. Examples of UI controls include buttons, lists, and text fields. UI controls are commonly used for organizing content displayed in the GUI, for providing a mechanism for user navigation and input, for notifying about app status change, and/or other such events and actions. A collection or composite of UI controls may be called a UI component herein.

In a typical UI, a list UI component includes many possible options and functions. When a list UI component is created, the UI designer or programmer has to make many UI design choices for the list UI component. For example, the list UI component may be arranged in various ways (e.g., horizontal or vertical); include other nested lists; and designed to accept and respond to particular user input/selections. Traditionally, the UI designer must manually program each list UI component for each instance in each application.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
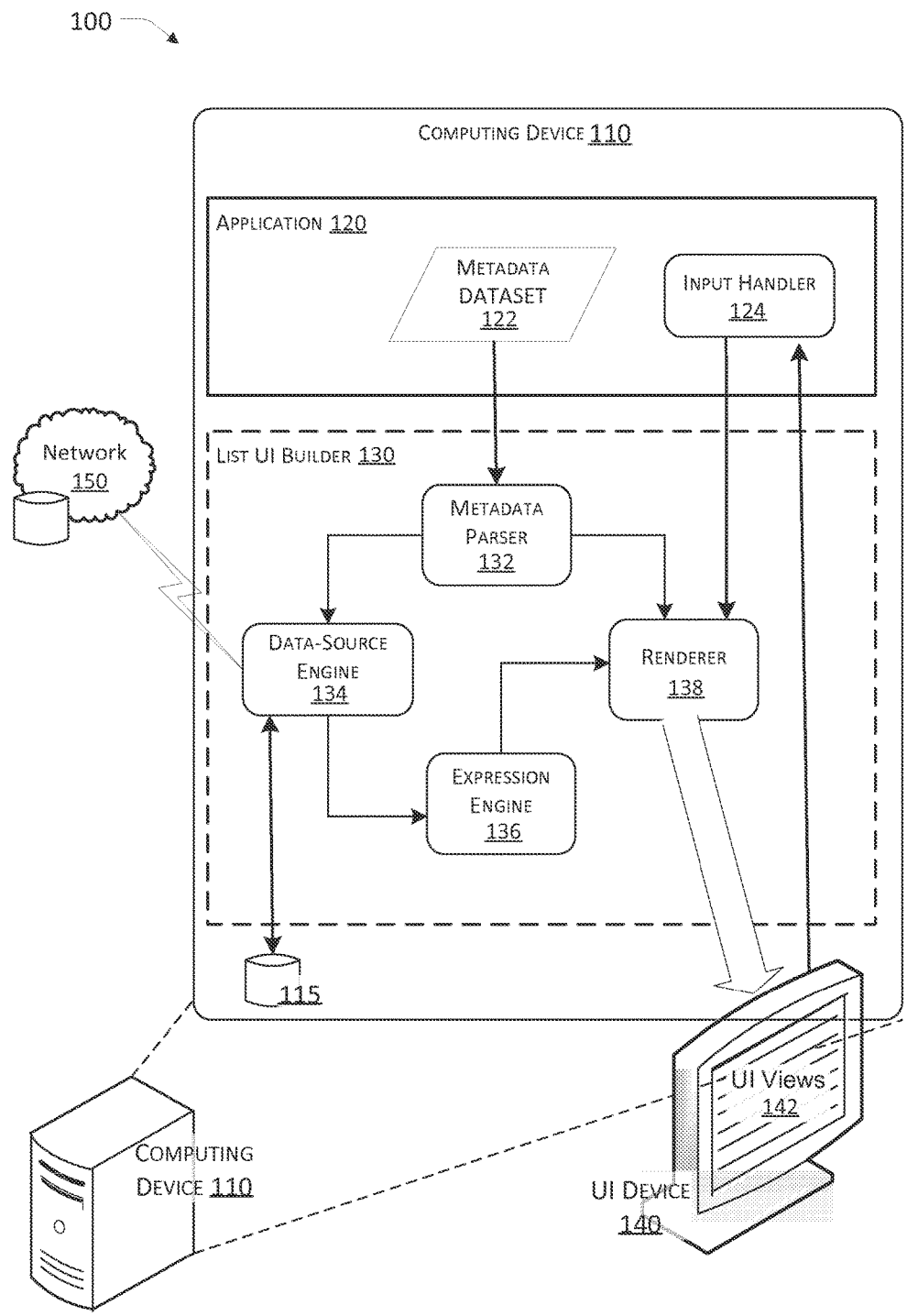
FIG. 1 illustrates an exemplary system in accordance with the technology described herein.

Disclosed herein are technologies for metadata-driven building of list user interface (UI) components of an application. A typical list UI component includes a list view, a grid view, or a non-repetitive form view. A list UI component is a composite UI control that arranges a set of items in a vertical or horizontal list-like layout. The list UI component is often used to display data, navigate to further information (i.e., "drill-down") and accept user selection/input. The views of a list UI component contain a single or multiple repeatable items, which may include some UI controls such as labels, images and input functions. Some of these UI controls are bound to a data source. Such data source may include local data sets, remote database accesses, file downloads, and/or the like.

While generally called list UI components (or simply a "list UI"), each list UI component is potentially different and thus needs to be customized to the particular needs of the application or that particular use within the application. Consequently, a user of the application typically must write a substantial amount of source code to program each list UI component to, for example, perform its requisite data retrieval and processing, view rendering, and update the list UI component in response to user inputs.

Ideally, the application developer would write source code that would separate data and views so that changes to the UI will not affect data handling and that the data can be reorganized without changing the UI. However, such decoupling is difficult to achieve. Most application developers are focused on accomplishing the overall task of the application rather than the mundane details of creating and maintaining list UI components.

This is especially true for the users of a what-you-see-is-what-you-get (WYSIWYG) application development program. Such users often do not have much programming skills and prefer to create applications in an intuitive way with minimal effort. With conventional application development tools, the users do not have a simple way to build a list UI component with the ability to manipulate its data source and layout.

Sometimes, a development platform may require the user to write the source code in a particular programming language with which the user is not familiar. Building a list UI component becomes even more challenging for the user.

In accordance with the technology described herein, a user creates a metadata dataset to define and/or describe the data sources, view layout, and function of the list UI component. The metadata dataset may be, for example, a file or a string. An executable and reusable library builds a list UI component for an application based upon its list UI metadata dataset for that application.

Conventionally, application developers were restricted to using the same programming language (e.g., of the source code) to create their application as used for the source code for the application programming interface (API) to create the list UI components. However, the technology described herein uses metadata instead of the conventional source-code API to create the list UI components. Because of this, the application developers are free to choose any programming language they wish to use to create their application. That is, the programming language of the source code of an implementation of the technology described herein does not affect the choice of programming language of the source code of the application itself. Indeed, the programming languages of the source code of each may differ from others.

In addition, with the technology described herein, it is also possible to design a list UI component in one physical location and build it in another physical location. To do this, the metadata dataset may be transmitted from one location to the other. The cross-language and cross-location features of the technology described herein provide great freedom to developers that they did not enjoy with the conventional approaches.

FIG. 1 depicts an exemplary metadata-driven list UI component builder system 100 for implementing the technology described herein. The system 100 includes a computing device 110, a UI device 140, and a network 150.

Although not depicted, the computing device 110 includes a memory, one or more processor(s), secondary storage systems (e.g., hard drive), and input/output systems (e.g., keyboard).

The computing device 110 also includes an application 120 and a list UI builder 130. These functional components may be separate or some combination of hardware units. Alternatively, the components may be implemented, at least in part, in software and thus be stored in the memory and executed by the processors of the computing device 110 or by multiple interconnected computing devices.

The application 120 is, at least in part if not as a whole, an executable program executing on the computing device 110. Of course, the application 120 is programmed to accomplish some task, such as word processing, entertainment, media consumption, etc. The application 120 contains (or has closely associated therewith) a list UI metadata dataset 122 and an input handler 124.

The metadata is a structural set of data that describes the design and specification of data structures, and may be thought of as "data about the containers of data." The metadata of the list UI metadata dataset 122 describes the layout, content, and behavior of one or more list UI components of a UI. The list UI metadata dataset 122 is discussed in more detail hereafter.

The input handler 124 is designed to manage input for the application 120 and respond accordingly. While such input may come from some source external to the application, the user input from the UI device 140 (or devices) is of particular interest herein. A UI device 140 may include, for example, one or more of a monitor, a touchscreen, a keyboard, a mouse (or other pointing device), and the like. Although stated in the singular, the UI device 140 may include multiple separate devices (e.g., computer monitor and trackpad).

The list UI builder 130 is, at least in part if not as a whole, an executable program, part of such a program, or as multiple executable programs. Indeed, the list UI builder 130 may be implemented as part of a reusable library. In this context, a library is a collection of executable programs that perform particular behaviors, written in terms of a computer programming language that has a well-defined interface by which the behavior is invoked. Such a library may be called a software library, a framework library, a dynamic link library, a dynamic load library, a relocation library, a static library, a shared library, or the like. While shown as two separate components, some implementations may combine the application 120 and the list UI builder 130 into a single executable program or file.

Users interact with list views (e.g., UI views 142) and may trigger some events that the views expose. For example, the users may select an item in a list UI that triggers a viewing of another UI view. If the users want to handle the events themselves, they can register their input handlers 124 with list UI builder 130. This registration may request that a renderer 138 of the list UI builder 130 update current view based upon input from the input handler 124. List drill-down is a typical user interaction to trigger such navigation among views.

The list UI builder 130 contains (or has closely associated therewith) a metadata parser 132, a data-source engine 134, an expression engine 136, and a renderer 138.

The list UI builder 130 loads the list UI metadata dataset 122 into the metadata parser 132. The metadata parser 132 parses the metadata from the list UI metadata dataset 122 and sends the relevant parsed data to other components of the list UI builder 130. For example, the metadata parser 132 sends information about the layout of a list UI component to the renderer 138. In addition, for example, the metadata parser 132 sends information about acquiring content (e.g., images) to the data-source engine 134. Furthermore, the metadata parser 132 sends expressions (either directly or via another component) to the expression engine 136 for the expression engine 136 to determine the appropriate conditional behavior for the list UI builder 130 to perform. The parsing functionality of the metadata parser 132 will be more apparent after reading a later discussion herein about the list UI metadata dataset 122.

The renderer 138 receives UI layout information from the metadata parser 132. Based at least in part upon that parsed layout information, the renderer 138 generates a layout and presents that layout as a UI view of the UI views 142. The renderer 138 also includes content sourced by the data-source engine 134 and responds to conditions and input as directed to do so by the expression engine 136 and the input handler 124.

Based at least in part upon that parsed data-source information, the data-source engine 134 retrieves data from some source of such data. The source may be a local storage unit 115 or a remote storage system 150. This remote storage system 150 may be networked server, multiple distributed servers, some data source on the Internet, or perhaps the so-called "cloud." Typically, the retrieved data includes contents, such as textual info and digital images. The retrieved data may be sent directly or indirectly (e.g., via the expression engine 136) to the renderer 138 for the renderer to incorporate the retrieved data into a UI view of the UI views 142.

Based at least in part upon that parsed conditional information and perhaps retrieved content, the expression engine 136 determines and formats raw data before feeding it to the renderer 138.

As stated above, the metadata of the list UI metadata dataset 122 is a structural set of data that describes the layout, content, and behavior of one or more list UI components (e.g., UI list views) of a UI. The UI list views include both data part and layout part. The data part specifies data sources (e.g., a remote data service that provides the data to populate lists), navigation linkages to the next level list view (e.g., for drill-down lists), and the data types of each table columns. The layout part specifies the controls appearing in the view and their styles.

Table 1 is an example of metadata of the list UI metadata dataset 122 that is created in accordance with the technology described herein.

TABLE 1

```
<SuperList TransitionEffect="pull down">
  <ListView>
    <DataTable Url="getCategoryList" NavigationParameters=
    "categoryId">
      <Column Name="categoryId" DataType="number" />
      <Column Name="categoryName" DataType="string" />
    </DataTable>
    <DetailBand>
      <Image Url=" ' images\ ' + categoryId + ' .png ' " />
```

TABLE 1-continued

```
      <Label Text="categoryName" StyleClass=" 'cat_name' " />
      <Image Url=" ' ./images/listArrow.png' " />
    </DetailBand>
  </ListView>
  <ListView>
    <DataTable Url="getProductList">
      <Column Name="productId" DataType="number" />
      <Column Name="categoryId" DataType="string" />
      <Column Name="productName" DataType="string" />
      <Column Name="productDesc" DataType="string" />
      <Column Name="productPrice" DataType="number" />
      <Column Name="dealType" Datatype="string" />
    </DataTable>
    <DetailBand>
      <Image Url=" ' images \ ' + productId + ' .png' " />
      <Panel>
        <Label Text="productName" />
        <Label Text="productDesc" StyleClass=" 'product desc' "/>
        <Label Text="IF(dealType == 'Promotion', 0.8*productPrice, productPrice)" Format="currency"/>

</Panel>
      <Image Url=" ' ./images/listArrow.png' " />
    </DetailBand>
  </ListView>
</SuperList>
```

In Table 1 this line is highlighted: <Label Text="IF (dealType=='Promotion', 0.8*productPrice, productPrice)" Format="currency"/>. With such expressions in the metadata, the user is invoking the list UI builder 130 to process the column data and decide which format to feed into the controls of the list UI component. The expression engine 136 is able to compute and convert different types of data as well as evaluating functions and logical expressions.

Figure 2:
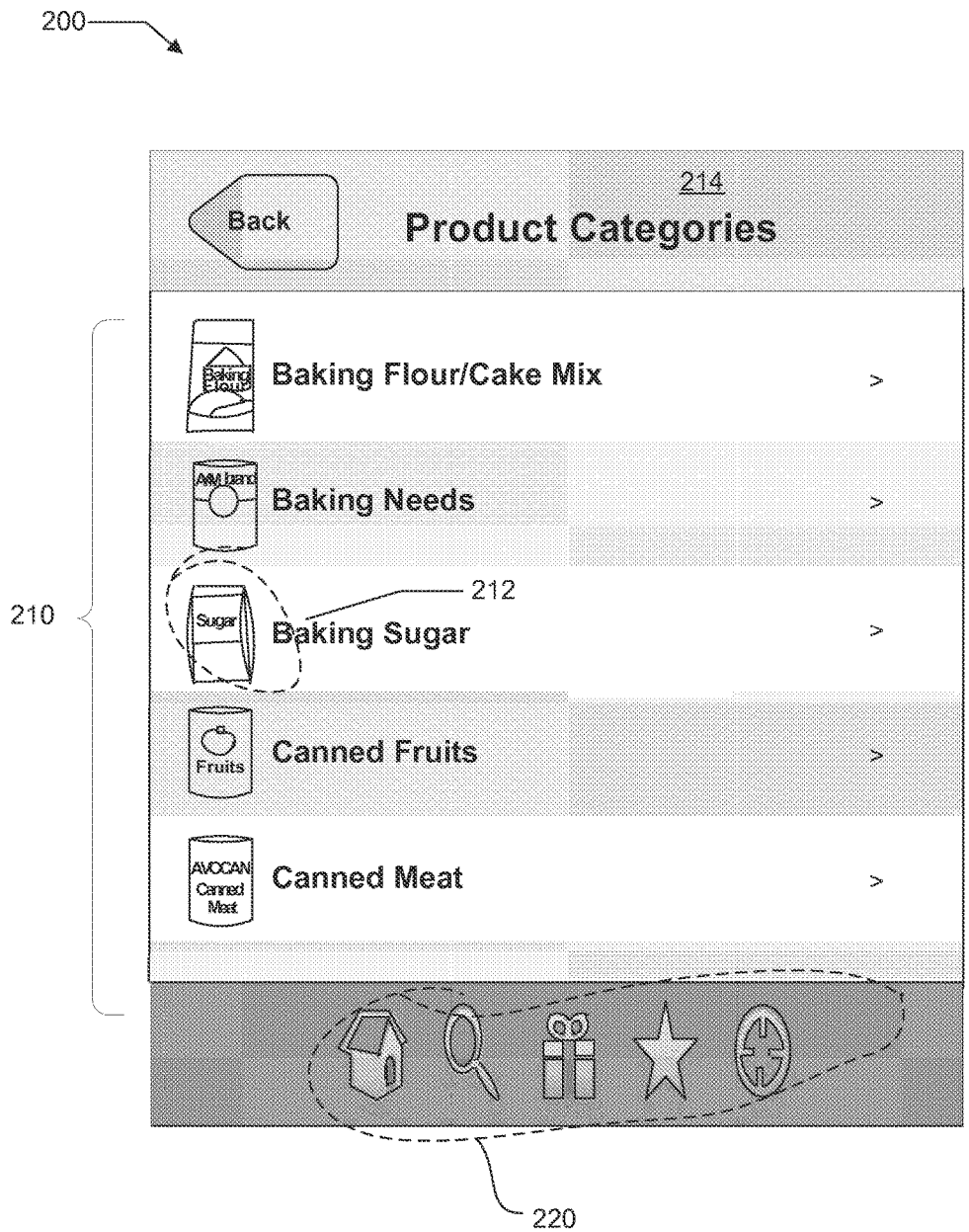
FIGS. 2-5 show exemplary list user interface views that may be produced by one or more implementations in accordance with the technology described herein.

FIG. 2 shows an exemplary list UI component 200 that may be generated by the technology discussed herein. All of the elements of the list UI component 200 are provided by the metadata of the list UI metadata dataset 122. List UI component 200 includes a vertical list 210 of selectable items. The layout and orientation of the list is defined by the metadata. The metadata also include data-source information so that, for example, an image of a bag of sugar is displayed for item 212. The metadata also include information about the content and layout of the list UI view for the title 214. In addition, the metadata includes information for the navigational buttons 220 at the bottom of the list UI view. Such information may include data-source information to retrieve the images for the buttons.

Figure 3:

FIG. 3 shows another exemplary list UI component 300 that may be generated by the technology discussed herein. This may be called a "group view" because the elements are grouped. As depicted, they are grouped by category. Table 2 shows exemplary metadata of the list UI metadata dataset 122 that is created in accordance with the technology described herein to produce the exemplary list UI component 300 shown in FIG. 3.

TABLE 2

```
<GroupView>
  <DataTable Url="getShoppingCartList">
    <Column Name="categoryId" DataType="number"/>
    <Column Name="categoryName" DataType="string"/>
    <Column Name="productId" DataType="number" />
    <Column Name="productName" Datatype="string" />
    <Column Name="price" DataType="number" />
```

TABLE 2-continued

```
    <Column Name="dealType" DataType="string" />
    <Column Name="qty" DataType="number"/ >
    <Column Name="selected" DataType="number"/ >
  </DataTable>
  <Group By="categoryId">
    <HeaderBand>
      <Label Text="categoryName" />
    </HeaderBand>
  </Group>
  <DetailBand StyleClass=" 'AlternateRow' ">
    <Image Url=" 'images \ ' + productId + '.png' " />
    <Panel StyleClass=" 'item_order' " />
      <Label Text="productName" />
      <Panel StyleClass=" 'NewRow' " >
        <CheckBox Value="selected" />
        <Label Text="price" Format="currency"/>
        <Input Value="qty" StyleClass=" 'item_quantity' " />
        <Label Text =" ' = ' " />
        <Label Text="price * qty" Format="currency"/>
      </Panel>
    </Panel>
  </DetailBand>
```

In Table 2 this line is highlighted: <Label Text="price*qty" Format="currency"/>. With such expressions in the metadata, the expression engine 136 of the list UI builder 130 performs a calculation and directs the renderer 138 to display the results 310 of that calculation in the list UI view.

Figure 4:
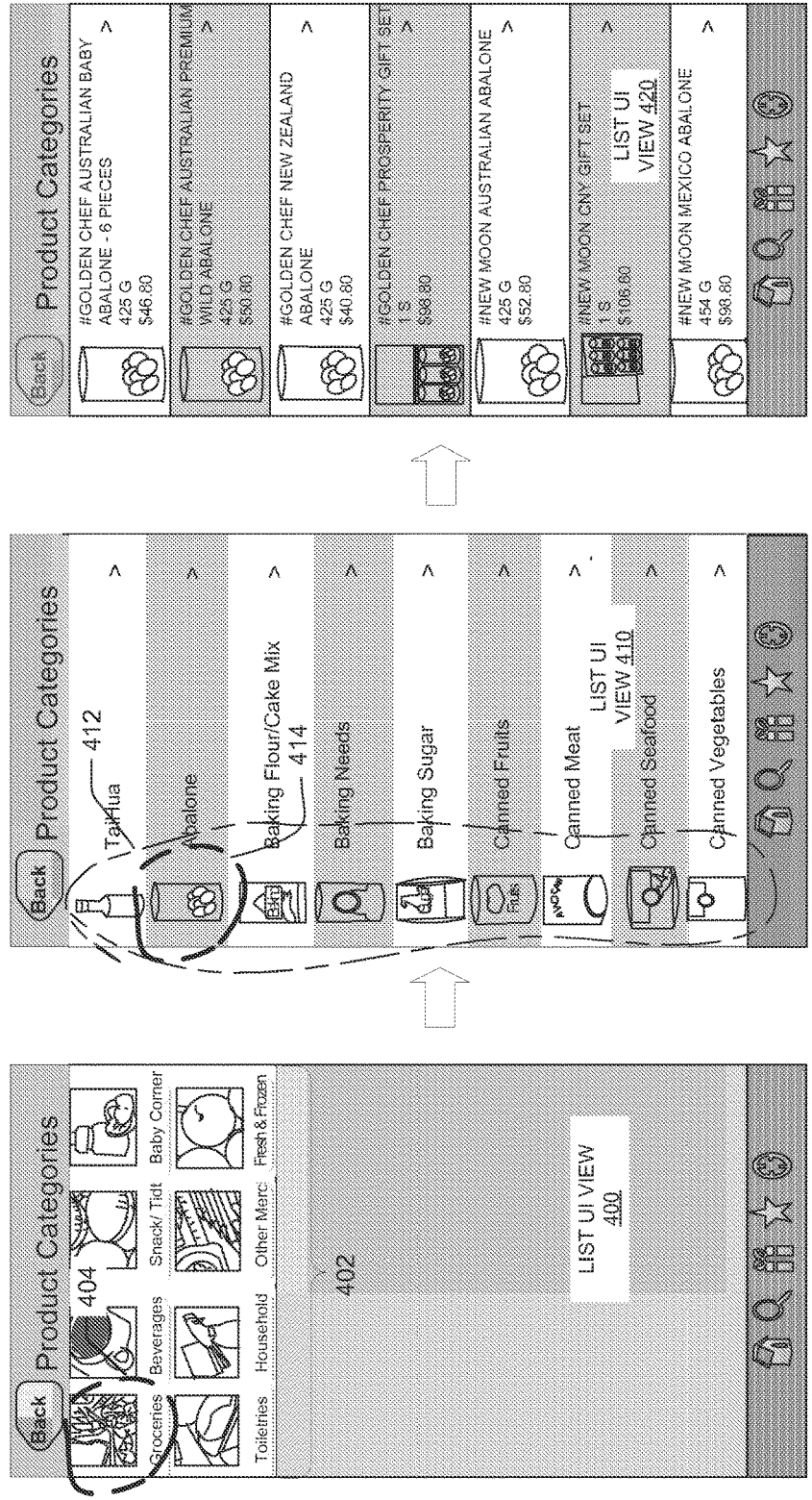

FIG. 4 shows several other exemplary list UI components (i.e., list UI views) 400, 410, and 420 that may be generated by the technology discussed herein. FIG. 4 illustrates an exemplary illustration of navigation between different list UI views, such as list UI views 400, 410, 420. This illustrates the navigation of and the use of metadata to drive the creation of drill-down lists UI components in accordance with the technology described herein.

The list UI view 400 is a first- or top-level list UI view. As depicted, the list UI view 410 shows a category list of products. The list UI view 400 shows a listing 402 of navigable images. Table 3 is an exemplary metadata of the list UI metadata dataset 122 that is created in accordance with the technology described herein to produce the list UI view 400 shown in FIG. 4.

TABLE 3

```
<SuperList TransitionEfFect="pulldown">
  <ListView>
    <DataTable Url="getMainCategoryList"  NavigationParameters=
    "categoryId">
      <Column Name="categoryId"  DataType="number"  />
      <Column Name="categoryName"  DataType="string"  />
      <Column Name="parentCategoryId"  DataType="number"  />
    </DataTable>
    <DetailBand StyleClass=" 'product_categories' ">
      <Image Url=" 'images\' + categoryId + '.png' "
      StyleClass=" 'product_cat_pic' " />
      <Label Text="categoryName"  StyleClass="
      'product_categories' "  />
    </DetailBand>
  </ListView>
```

For the purpose of illustration, presume that the user selects item 404 of the list UI view 400. In response to user input that selects item 404, the list UI builder generates and presents exemplary list UI view 410. The list UI view 410 is a second- or mid-level list UI view. As depicted, the list UI view 410 shows a sub-category list of products. The list UI view 410 shows a listing 412 of navigable images.

For the purpose of illustration, presume that the user selects item 414 of the list UI view 410. In response to user input that selects item 414, the list UI builder generates and presents list UI view 420. The list UI view 420 is a third- or bottom-level list UI view. As depicted, the list UI view 420 shows a product list. Table 4 shows exemplary metadata of the list UI metadata dataset 122 that is created in accordance with the technology described herein to produce the list UI views 410 and 420 shown in FIG. 4.

TABLE 4

```
<ListView>
  <DataTable Url="getCategoryList" NavigationParameters="categoryId">
    <Column Name="categoryId" DataType="number" />
    <Column Name="categoryName" DataType="string" />
    <Column Name="parentCategoryId" DataType="number" />
  </DataTable>
  <DetailBand StyleClass=" 'AlternateRow' ">
    <Image Url=" 'images\' + categoryId + '.png' " StyleClass=
    " 'product_sub_cat_pic' " />
    <Label Text="categoryName" StyleClass=
    " 'info_row_sub_cat_name' " />
    <Image Url=" './images/listArrow.png' " StyleClass=" 'list_arrow' "
    />
  </DetailBand>
</ListView>
<ListView>
  <DataTable Url="getProductLIst" Navigation Parameters="productId">
    <Column Name="productId" DataType="number" />
    <Column Name="categoryId" Datatype="string" />
    <Column Name="productName" DataType="string" />
    <Column Name="productDesc" DataType="string" />
    <Column Name="productPrice" DataType="number" />
    <Column Name="dealType" DataType="string" />
    <Column Name="dealPrice" DataType="number" />
    <Column Name="tag" DataType="string" />
  </DataTable>
  <DetailBand StyleClass=" 'AlternateRow' ">
    <Image Url=" 'images\' + productId + '.png' " />
    <Panel StyleClass=" 'info_ row' ">
      <Label StyleClass=" 'product_info' " Text="productName" />
      <Label StyleClass=" 'product_info' " Text="productDesc" />
      <Label StyleClass=" 'product_info' " Text="productPrice" Format=
      "currency" />
    </Panel>
    <Image Url=" './images/listArrow.png' " StyleClass=" 'list_arrow' "
    />
  </DetailBand>
</ListView>
```

In Table 4 this line is highlighted: <DataTable Url="getCategoryList" NavigationParameters="categoryID">. This documents the parameters passed to the data-source engine 134 for retrieving the content that will be displayed in a list view, for example list UI view 420 shown in FIG. 4.

Figure 5:
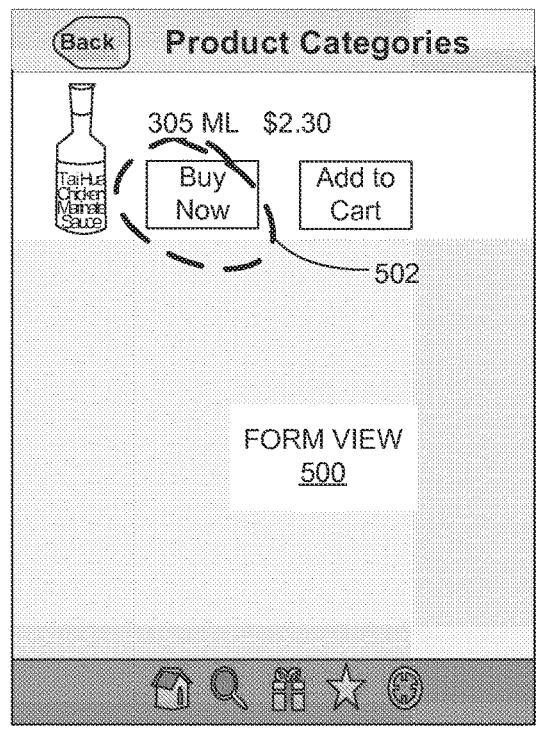
Figure 5:
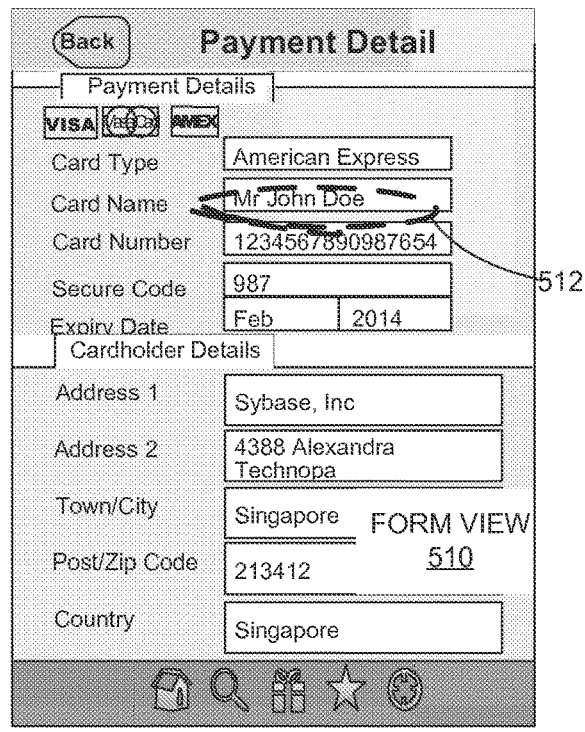

FIG. 5 shows other exemplary list UI components (i.e., form views) 500 and 510 that may be generated by the technology discussed herein. Each of these list UI views of FIG. 5 are examples of non-repetitive forms or non-repeating lists. As depicted, each list UI view provides a mechanism for the user to provide information (e.g., a button selection 502 or data entry 512).

Figure 6:
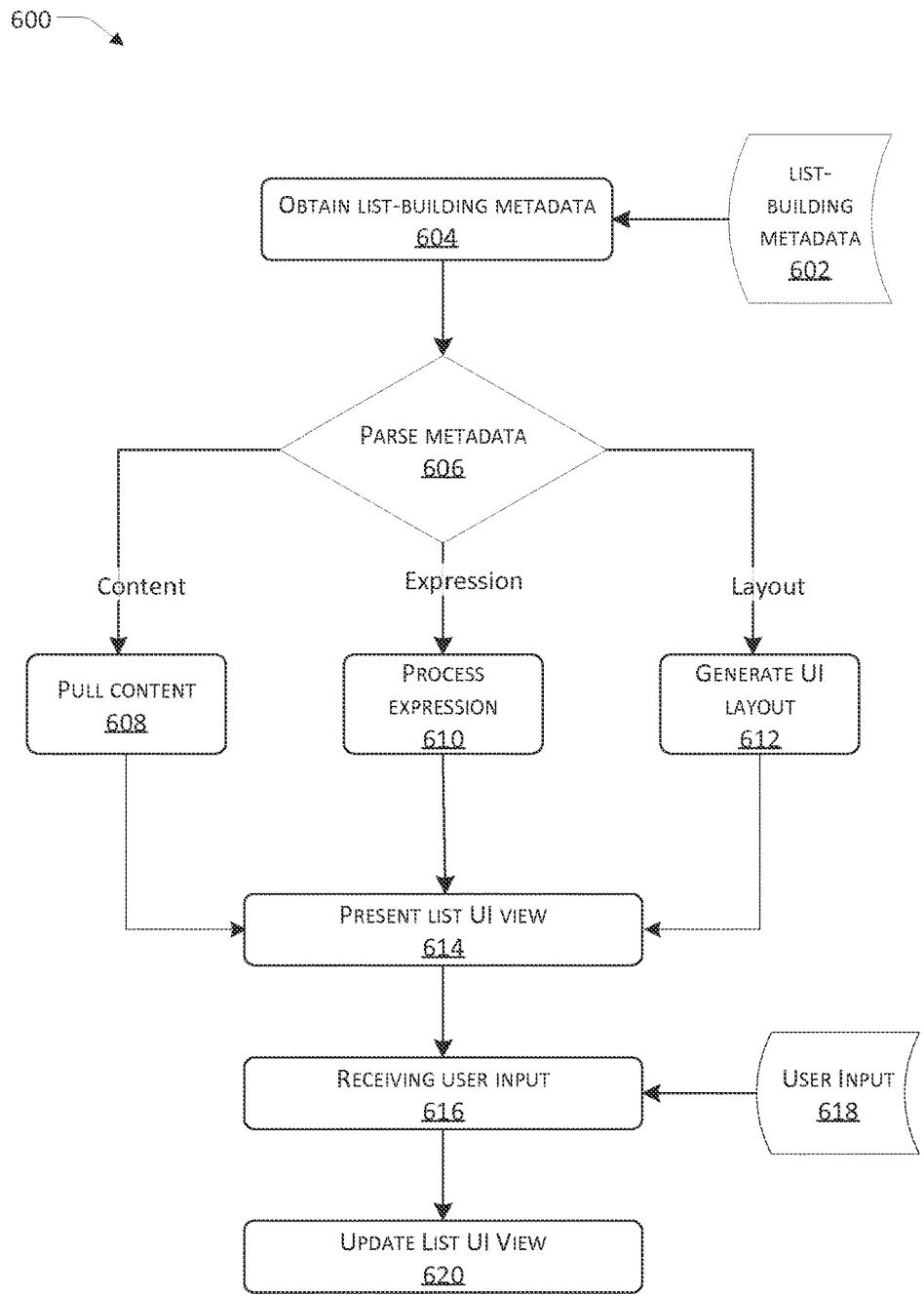
FIG. 6 illustrates an exemplary process in accordance with the technology described herein.

FIG. 6 illustrates an exemplary process 600 for implementing, at least in part, the technology described herein. In particular, process 600 depicts an operation of the list UI builder 130. The process 600 is performed by, for example, the computing device 110, the system 100, or some other suitable computing system.

List-building metadata 602 is stored on the computing device 110 or is otherwise accessible therefrom. A user (i.e., human) creates the list-building metadata 602 to direct the layout, content, and function/behavior of the resulting list UI views. The list-building metadata 602 may be a stored text file. Alternatively, it may be data stashed into the application (such as application 120) itself.

At 604, the list UI builder 130 obtains list-building metadata from, for example, an application executing on the computing device 110.

At 606, the list UI builder 130 parses the obtained list-building metadata. In doing so, the builder groups like metadata and sends grouped metadata to be processed together.

At 608, the list UI builder 130 pulls content (e.g., images) from a data source based upon metadata parsed from the obtained list-building metadata. A data source may be, for example, a local storage of relevant data or a remote or network storage of such data.

At 610, the list UI builder 130 processes expressions that were parsed from the obtained list-building metadata. Expressions may include logical or conditional statements. Expressions also include actions or behaviors that may be performed in response to certain conditions or input or the like. Often, an expression may be triggered by or after a specific content is pulled. In addition, an expression triggers the acquisition of particular contents.

At 612, the list UI builder 130 generates layout of the list UI view based upon layout information parsed from the obtained list-building metadata. This may be a preliminary layout.

At 614, the list UI builder 130 presents a list UI component of a UI on a display of a computing system. The presented list UI component is based upon the results of the operations 608, 610, and 612. At this point, a fully functional list UI component is available for the user to interact with.

At 616, the list UI builder 130 receives user input 618 from the application executing on the computing system.

At 620, in response to the received user input, the list UI builder 130 updates the presented list UI component of the UI on the display. This update may result in a new list UI view, such as a drill-down list.

Figure 7:
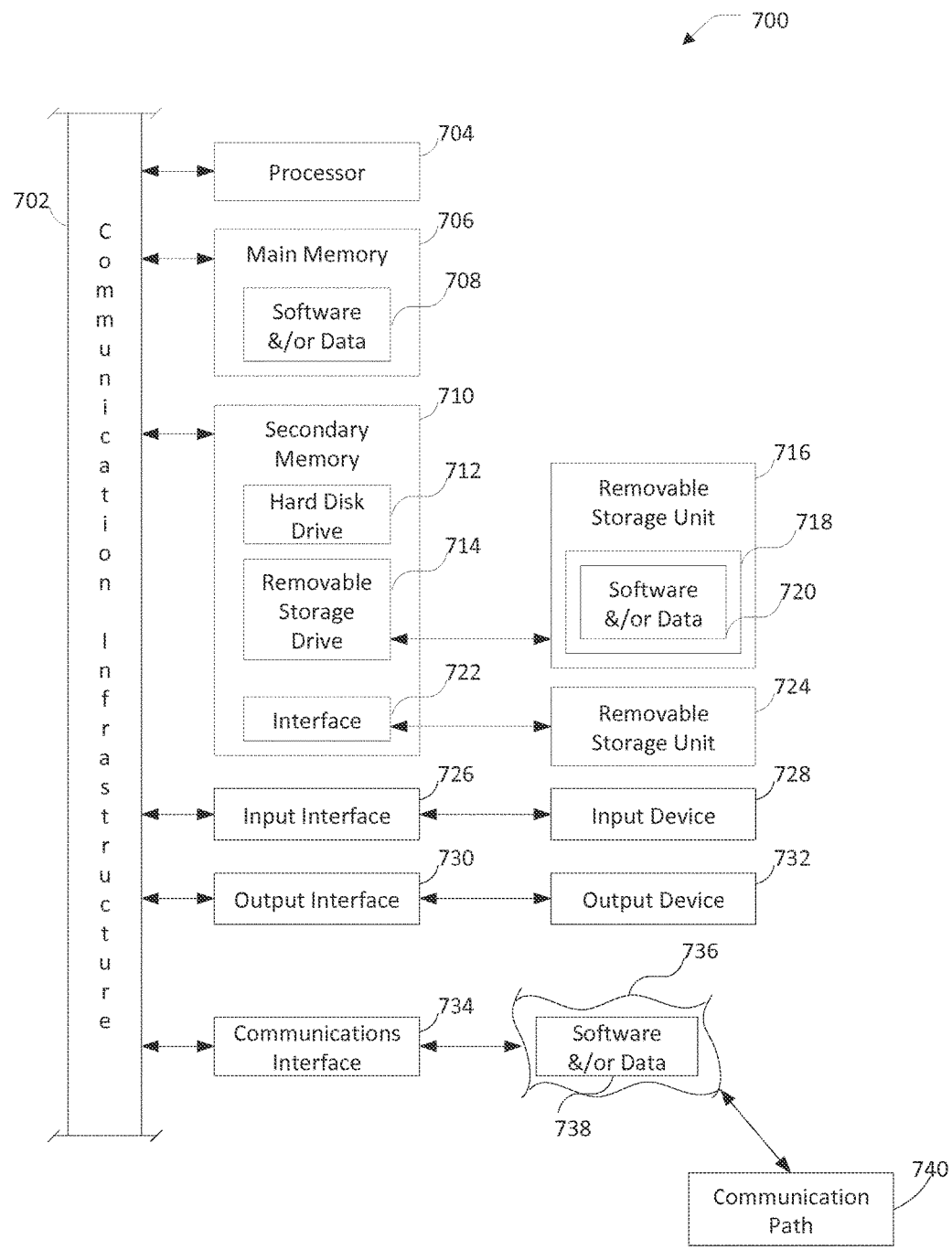
FIG. 7 illustrates an exemplary computing system to implement in accordance with the technologies described herein.

FIG. 7 illustrates an exemplary system 700 that may implement, at least in part, the technologies described herein. The computer system 700 includes one or more processors, such as processor 704. Processor 704 can be a special-purpose processor or a general-purpose processor. Processor 704 is connected to a communication infrastructure 702 (for example, a bus or a network). Depending upon the context, the computer system 700 may also be called a client device.

Computer system 700 also includes a main memory 706, preferably Random Access Memory (RAM), containing possibly inter alia computer software and/or data 708.

Computer system 700 may also include a secondary memory 710. Secondary memory 710 may include, for example, a hard disk drive 712, a removable storage drive 714, a memory stick, etc. A removable storage drive 714 may include a floppy disk drive, a magnetic tape drive, an optical disk drive, a flash memory, or the like. The removable storage drive 714 reads from and/or writes to a removable storage unit 716 in a well-known manner. A removable storage unit 716 may comprise a floppy disk, a magnetic tape, an optical disk, etc. which is read by and written to by removable storage drive 714. As will be appreciated by persons skilled in the relevant art(s), removable storage unit 716 includes a computer usable storage medium 718 having stored therein possibly inter alia computer software and/or data 720.

In alternative implementations, secondary memory 710 may include other similar means for allowing computer-program products or other instructions to be loaded into computer system 700. Such means may include, for example, a removable storage unit 724 and an interface 722. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 724 and interfaces 722 which allow software and data to be transferred from the removable storage unit 724 to computer system 700.

Computer system 700 may also include an input interface 726 and a range of input devices 728 such as, possibly inter alia, a keyboard, a mouse, etc.

Computer system 700 may also include an output interface 730 and a range of output devices 732 such as, possibly inter alia, a display, one or more speakers, etc.

Computer system 700 may also include a communications interface 734. Communications interface 734 allows software and/or data 738 to be transferred between computer system 700 and external devices. Communications interface 734 may include a modem, a network interface (such as an Ethernet card), a communications port, a Personal Computer Memory Card International Association (PCMCIA) slot and card, or the like. Software and/or data 738 transferred via communications interface 734 are in the form of signals 736 which may be electronic, electromagnetic, optical, or other signals capable of being received by communications interface 734. These signals 736 are provided to communications interface 734 via a communications path 740. Communications path 740 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 716, removable storage unit 724, and a hard disk installed in hard disk drive 712. Computer-program medium and computer-usable medium can also refer to memories, such as main memory 706 and secondary memory 710, which can be memory semiconductors (e.g. Dynamic Random Access Memory (DRAM) elements, etc.). These computer program products are means for providing software to computer system 700.

Computer programs (also called computer control logic) are stored in main memory 706 and/or secondary memory 710. Such computer programs, when executed, enable computer system 700 to implement the present technology described herein. In particular, the computer programs, when executed, enable processor 704 to implement the processes of aspects of the above. Accordingly, such computer programs represent controllers of the computer system 700. Where the technology described herein is implemented, at least in part, using software, the software may be stored in a computer program product and loaded into computer system 700 using removable storage drive 714, interface 722, hard disk drive 712 or communications interface 734.

The technology described herein may be implemented as computer program products comprising software stored on any computer-useable medium. Such software, when executed in one or more data processing devices, causes data processing device(s) to operate as described herein. Embodiments of the technology described herein may employ any computer useable or readable medium, known now or in the future. Examples of computer-useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-executable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of processor-executable instructions contained in or on a non-transitory computer-readable storage medium. Those processor-executable instructions may then be read and executed by one or more processors to enable performance of the operations described herein. The processor-executable instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc. Processor-executable instructions may also be called computer-executable instructions herein. A computer-program product, as used herein, include one or more computer-readable media of program-executable instructions.

What is claimed is:

1. A method that facilitates presentation of a list user interface (UI) component of a UI, the method comprising:
   obtaining list-building metadata including at least one conditional statement;
   parsing the obtained list-building metadata;
   pulling content from a data source based upon metadata parsed from the obtained list-building metadata;
   processing expressions including the conditional statement parsed from the obtained list-building meta data;
   creating a list UI component of a UI based upon the pulled content and processed expressions;
   presenting the created list UI component on a display of a computing system;
   receiving user input from an application executing on the computing system; and
   in response to the received user input, updating the presented list UI component of the UI on the display, wherein the updating comprises generating a new list UI component based on an information obtained from an input handler previously registered to handle an event corresponding to the received user input, the input handler being executed by an application providing the list-building metadata;
   wherein source code of the application differs from code used to create the list UI component;
   wherein the metadata comprises an expression to invoke a UI list builder to process column data and decide which format to feed into controls of the generated new list UI component.

2. The method according to claim 1, wherein the list-building metadata is obtained from the application executing on the computing system.

3. The method according to claim 1, wherein the list UI component is selected from a group consisting of a list view, a grid view, and a non-repetitive form view.

4. The method according to claim 1, wherein the pulled content is selected from a group consisting of images, video, audio, and texts.

5. The method according to claim 1, wherein the data source is local to the computing system.

6. The method according to claim 1 further comprising generating a layout of the list UI component based upon metadata parsed from the obtained list-building metadata.

7. The method according to claim 1, wherein the new list UI component comprises a drill-down list UI component.

8. A computer-program product that facilitates presentation of a list user interface (UI) component of a UI, the computer-program product comprising:
   one or more non-transitory computer-readable media storing processor-executable instructions that when executed cause one or more processors to perform operations that facilitate presentation of a list user interface (UI) component of a UI, the operations comprising
   obtaining list-building metadata;
   parsing the obtained list-building metadata, wherein the parsed metadata comprises content information, at least one conditional statement, and UI layout information;
   pulling content from a data source based upon the content information parsed from the obtained list-building metadata;
   processing expressions including the conditional statement parsed from the obtained list-building metadata;
   generating a layout of the list UI component based upon the UI layout information parsed from the obtained list-building metadata;
   based upon results from the pulling, processing, and generating operations, creating a list UI component of a UI;
   presenting the created list UI component on a display of a computing system;
   receiving user input from an application executing on the computing system; and
   in response to the received user input, updating the presented list UI component of the UI on the display, wherein the updating comprises generating a new list UI component based on an information obtained from an input handler previously registered to handle an event corresponding to the received user input, the input handler being executed by an application providing the list-building metadata;
   wherein source code of the application differs from code used to create the list UI component;
   wherein the metadata comprises an expression to invoke a UI list builder to process column data and decide which format to feed into controls of the generated new list UI component.

9. The computer-program product according to claim 8, wherein the list-building metadata is obtained from an application executing on the computing system.

10. The computer-program product according to claim 9, wherein the application is generated from a source code of a programming language differing from a programing language of a source code of the computer-program product.

11. The computer-program product according to claim 8, wherein processing the expressions comprises calculating and converting different types of data.

12. The computer-program product according to claim 8, wherein the updating comprises generating a drill-down list UI component.

13. The computer-program product according to claim 8, wherein the list UI component is selected from a group consisting of a list view, a grid view, and a non-repetitive form view.

14. The computer-program product according to claim 8, wherein the pulled content is selected from a group consisting of images, video, audio, and text.

15. The computer-program product according to claim 8, wherein the data source is remote from the computing system.

16. An apparatus that facilitates presentation of a list user interface (UI) component of a UI, the apparatus comprising:
   one or more processors:

one or more non-transitory computer-readable media in communication with the one or more processors and storing processor-executable instructions that are operative with the one or more processors to perform operations including
  parsing list-building metadata, wherein the parsed metadata comprises content information, at least one conditional statement, and UI layout information;
  pulling content from one or more data sources based upon the content information parsed from the list-building metadata;
  processing expressions including the conditional statement parsed from the list-building metadata;
  generating a layout of the list UI component based upon the UI layout information parsed from the list-building metadata,
  creating a list UI component of a UI based upon results of the obtained data, the processed expressions, and the generated layout, and
  presenting the created list UI component on a display of a computing system; and
an input device for receiving user input from an application executing on the computing system, and wherein in response to the received user input, the processor-executable instructions are further operative with the one or more processors to update the presented list UI component of the UI on the display, wherein the updating comprises generating a new list UI component based on an information obtained from an input handler previously registered to handle an event corresponding to the received user input, the input handler being executed by an application providing the list-building metadata;
wherein source code of the application differs from code used to create the list UI component;
wherein the metadata comprises an expression to invoke a UI list builder to process column data and decide which format to feed into controls of the generated new list UI component.

17. The apparatus according to claim 16, wherein the processor-executable instructions are further operative with the one or more processors to obtain the list-building metadata from an application executing on the computing system.

18. The apparatus according to claim 17, wherein the processor-executable instructions are further operative with the one or more processors to process the expressions by performing a calculation based on specific content pulled from the one or more data sources.

19. The apparatus according to claim 18, wherein the list UI component is selected from a group consisting of a list view, a grid view, and a non-repetitive form view.

20. The apparatus according to claim 19, wherein the pulled content is selected from a group consisting of images, video, audio, and texts.

21. The apparatus according to claim 20, wherein the processor-executable instructions are further operative with the one or more processors to generate a drill-down list UI component.

22. A computer-implemented method comprising:
  executing, on a computing device, an application containing a list user interface (UI) metadata dataset and an input handler,
    wherein metadata of the list UI metadata dataset describes layout, content, and behavior of one or more list UI components of a UI,
    wherein the input handler manages input for the application from a source external to the application and responds to same;
  executing, on the computing device, a list UI builder that is external and separate to the application, wherein the list UI builder is implemented as part of a reusable library and comprises a metadata parser, a data source engine, an expression engine, and a renderer, wherein the list UI metadata dataset is loaded into the metadata parser resulting in the metadata parser parsing the metadata of the list UI metadata dataset and sending the parsed metadata to other components of the list UI builder including (i) layout information to the renderer, (ii) information about acquiring content to the data source engine, and (iii) expressions to the expression engine for the expression engine to determine an appropriate conditional behavior for the list UI builder to perform,
  receiving user-generated input indicating that a user is interacting with list views rendered in a graphical user interface by the renderer of the list UI builder that trigger events that the list views expose, wherein the input handler is registered with the renderer of the list UI builder to handle events associated with the list views; and
  updating a current view in the graphical user interface based upon input from the input handler.

* * * * *